Oct. 17, 1933.  W. F. NEWHOUSE  1,930,822
BARRAL CROZING MACHINE
Filed Feb. 2, 1931  4 Sheets-Sheet 3

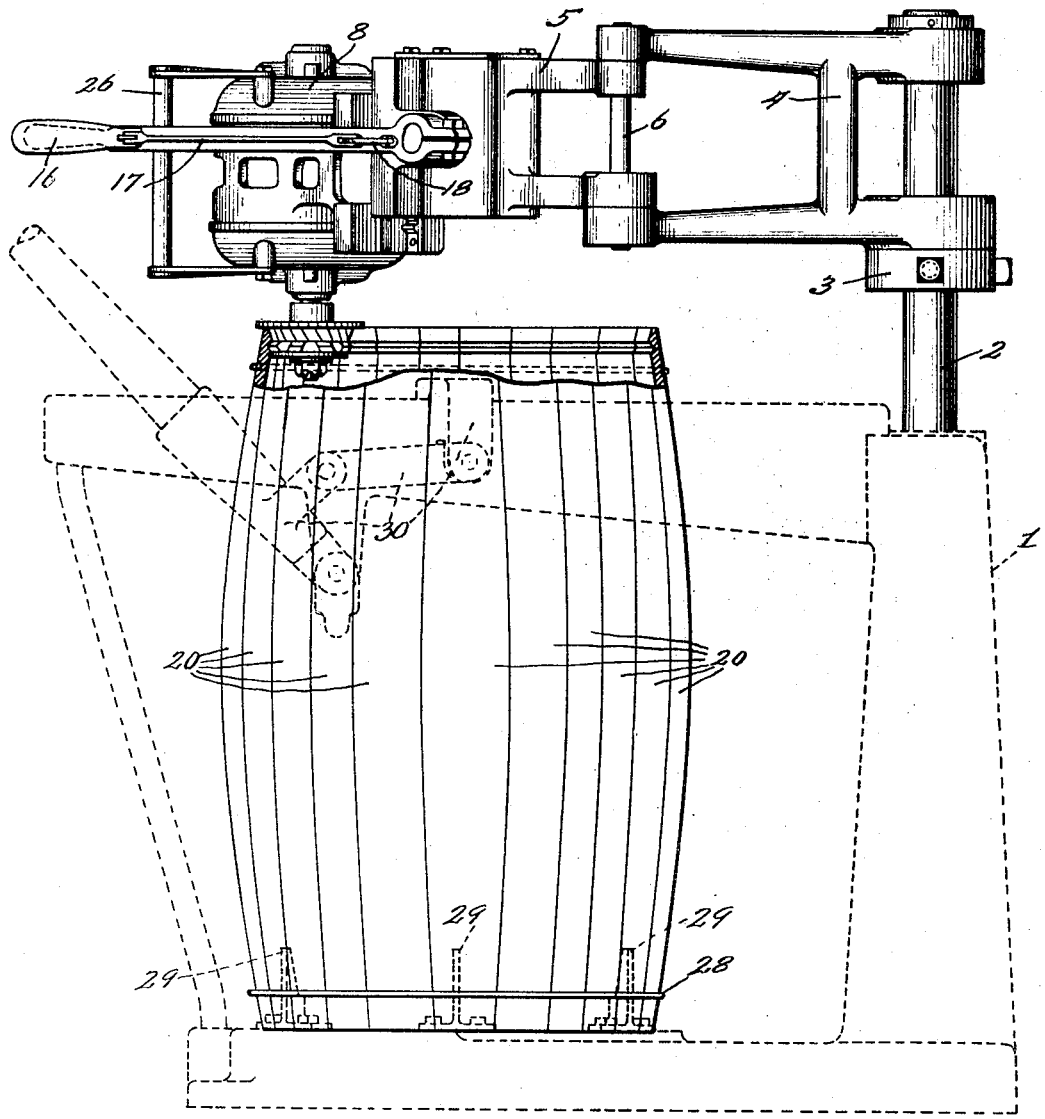
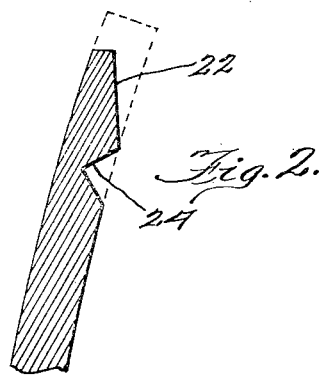
Fig. 1.
Fig. 2.

Inventor:
Walter F. Newhouse
By Arthur F. Durand
Atty.

Oct. 17, 1933.  W. F. NEWHOUSE  1,930,822
BARRAL CROZING MACHINE
Filed Feb. 2, 1931  4 Sheets-Sheet 4
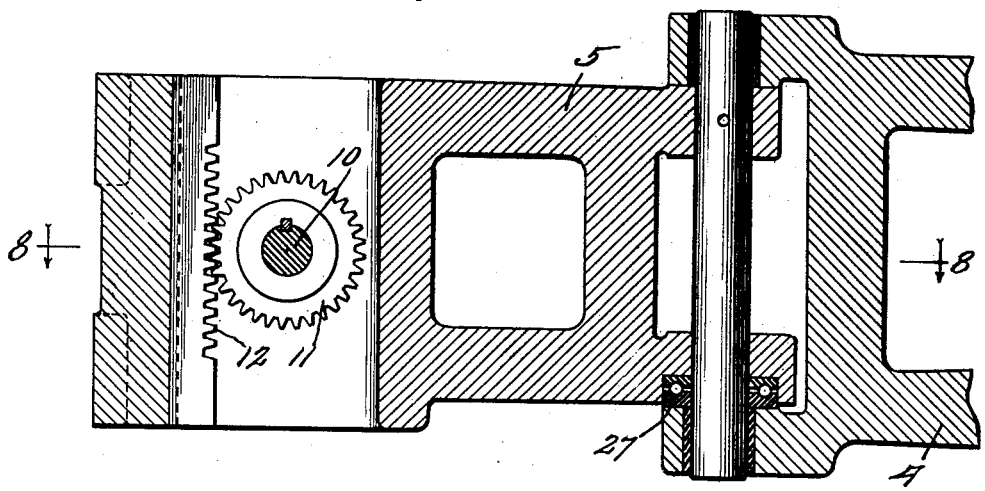
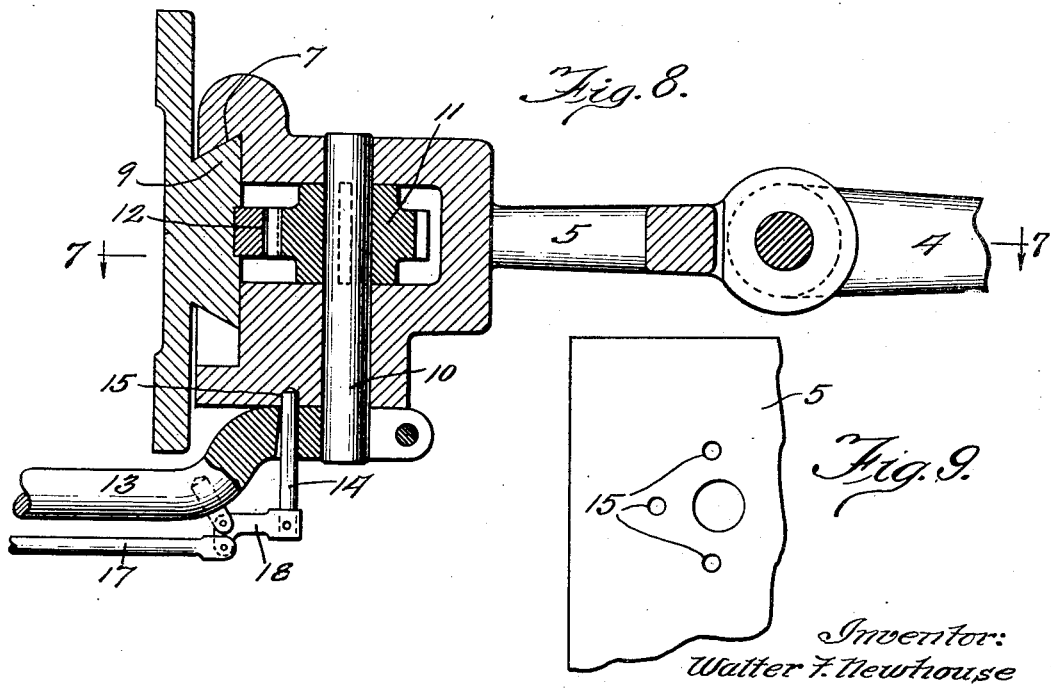
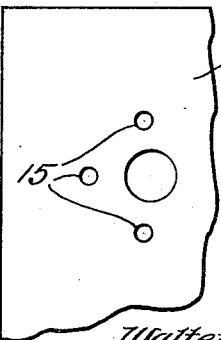
Inventor:
Walter F. Newhouse
By Arthur F. Durand
Atty.

Patented Oct. 17, 1933

1,930,822

UNITED STATES PATENT OFFICE 1,930,822

BARREL CROZING MACHINE

Walter F. Newhouse, Benton Harbor, Mich.

Application February 2, 1931. Serial No. 512,767

4 Claims. (Cl. 147—13)

This invention relates to machinery for cutting grooves in the inner sides of the staves of barrels, ordinarily called barrel crozing machines, and for trimming the end edges of the staves, thereby preparing the barrel stave assembly for the insertion of the barrel heads.

Generally stated, the object of the invention is to provide a novel and improved construction and arrangement whereby a rotary cutting device, for cutting and trimming the end portions of the staves, is adapted to be moved around the inside of the barrel stave assembly, when the latter is placed in position, said device having means for communicating power thereto, whereby the cutting and trimming is done in the desired manner, effectively and expeditiously, as will hereinafter more fully appear.

Another object is to provide a novel and improved construction whereby the said cutting device is under manual control, although driven by power, whereby said device is movable by hand around the interior of the barrel stave assembly.

Another object is to provide novel and improved means for raising and lowering the cutting device, conveniently, by hand-operated means, whereby the cutting device may be lowered into the barrel stave assembly, operated to cut the annular groove and trim the staves in the desired manner, and thereafter raised out of the barrel assembly.

It is also an object to provide certain details and features of construction and combinations tending to increase the general efficiency and desirability of a barrel crozing machine of this particular character.

To the foregoing and other useful ends, the invention consists in matters hereinafter set forth and claimed and shown in the accompanying drawings, in which—

Fig. 1 is a side elevation of a barrel crozing machine embodying the principles of the invention;

Fig. 2 is an enlarged sectional or fragmentary view of a portion of one of the barrel staves, showing the manner in which the machine cuts and trims the end portions of the staves;

Fig. 7 is a vertical section on line 7—7 in Fig. 8 of the drawings;

Fig. 8 is a horizontal section on line 8—8 in Fig. 7 of the drawings; and

Fig. 9 is a detail view of a fragment of the machine.

Figure 3:
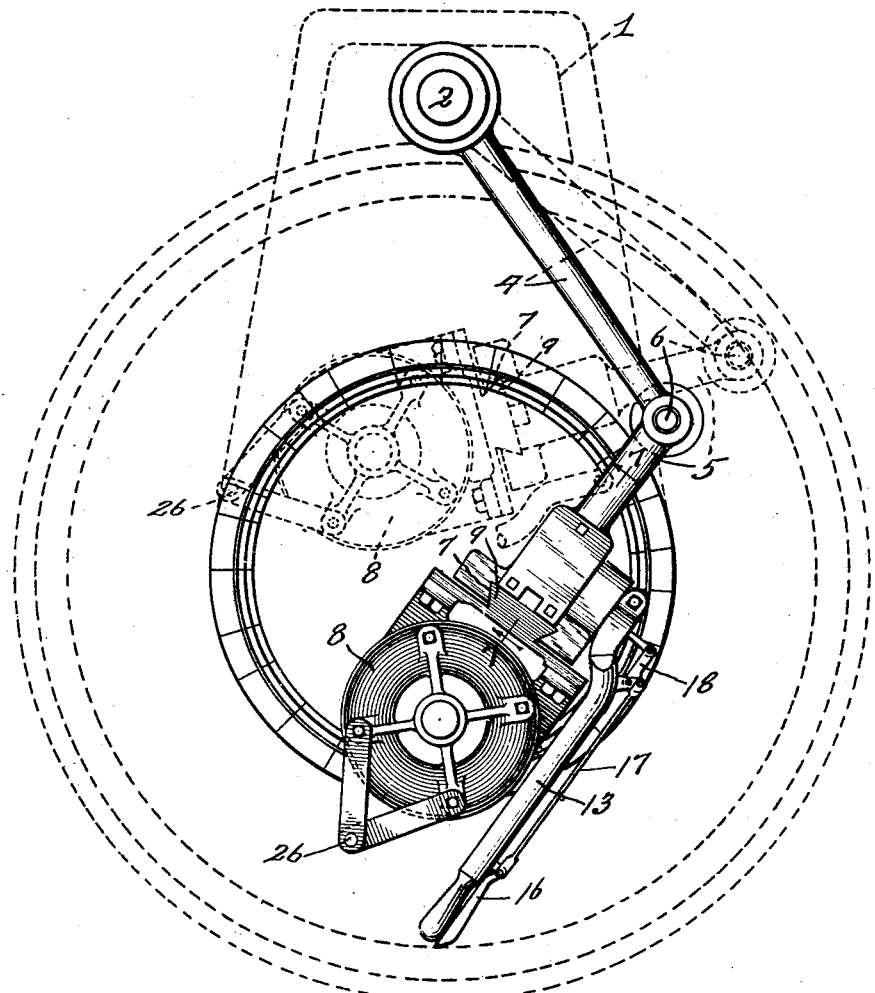
Fig. 3 is a plan view of said machine.

As thus illustrated, the invention comprises a body frame 1 of any suitable character, which may be the body frame of a barrel stave setting up machine, or the frame of a separate machine for cutting the annular groove and trimming the end portions of the staves of the barrel.

Upon the same frame, of whatever character, is mounted an upright post or pivot 2 in rigid position, at the back of the machine, and a collar 3 is rigidly, but adjustably, mounted on this post. Upon the said post, and resting upon the said collar, is a swinging bifurcated arm 4, which latter is adapted to swing about the vertical axis of said post. A toggle arm 5 is mounted on the outer end of the arm 4, by means of a pin or pivot 6, in the manner shown.

The toggle arm 5 is provided with a dovetail groove 7, as shown more clearly in Fig. 8 of the drawings, and the electric motor 8 has its frame provided with a dovetail portion 9 for engagement with the groove 7, whereby said motor is movable up and down on the arm 5, while in operation. For this purpose, the arm 5 is provided with a rock shaft 10, on which is fixed a pinion 11 for engagement with the rack 12, which latter is rigid with the dove tail portion 9 of the motor. A handle 13 is rigidly fixed on the outer end of the rock shaft 10, to operate the pinion 11, and this hand-lever is provided with a locking pin 14 for engagement with holes 15 in the side of the arm 5, (the holes being arranged in a curved row) and this locking pin is controlled by a pivoted handle 16, connected by a rod 17 with the bell crank 18, arranged as shown, the handle 16 being subject to the action of a spring (not shown), which yieldingly keeps the pin 14 in engagement with the said holes, but which permits withdrawal of the pin 14 from any hole, when the handle 16 is pressed toward the hand-lever 13, previously mentioned. Thus, by means of the hand-lever 13, the motor 8 may be raised and lowered on the arm 5, and, by means of the handle 16, the motor may be locked in its raised or lowered position, in a manner that will be readily understood.

Figure 4:
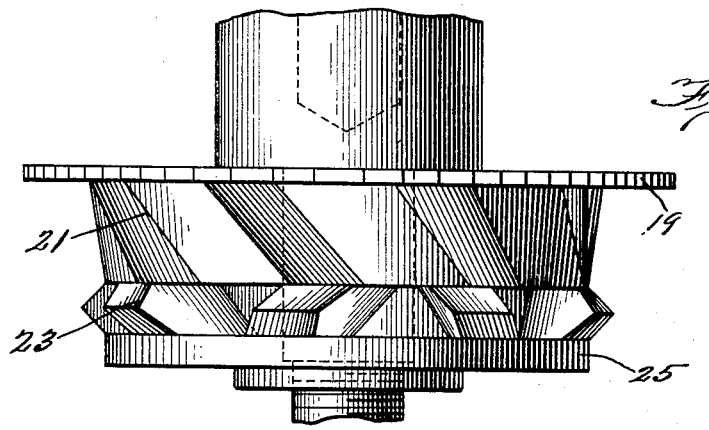
Fig. 4 is a side elevation, on a larger scale, of the cutting device of said machine.
Figure 5:
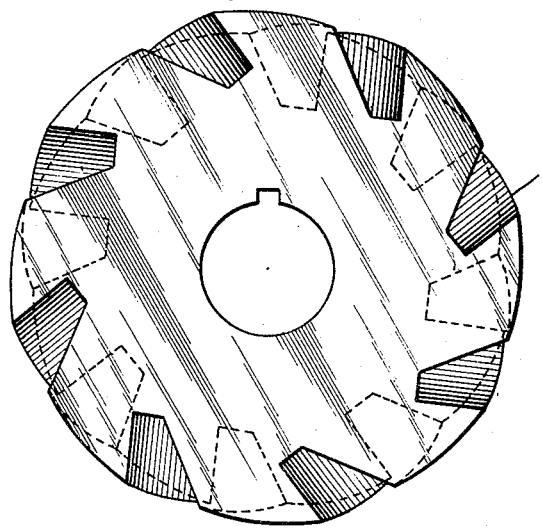
Fig. 5 is a plan view of one of the cutters of said device.
Figure 6:
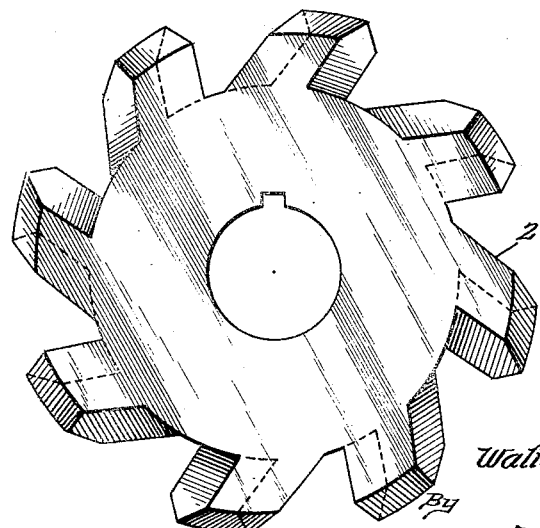
Fig. 6 is a similar view of one of the other cutters of said device.

Said motor 8 has the lower end of its shaft provided with a cutting head, or cutting device, of the kind shown more clearly in Figs. 4, 5 and 6 of the drawings. This cutting device, or cutter head, comprises three cutters,—one, a saw 19 for trimming off the upper ends of the barrel staves 20, shown in the drawings; another, the cutter 21 for trimming the surfaces 22 of the staves; and another, the cutter 23 for cutting the annular groove 24 in the inner sides of the barrel staves. It will be seen that the disk 25 engages the staves immediately below the cutter 23, thus limiting the extent to which the cutting device, or cutter head, can cut and trim the staves, leaving the staves in the condition shown in full lines in Fig. 2 of the drawings, having cut away the portions indicated in dotted lines in this figure of the drawings.

For the purpose of manually controlling the power-operated cutter head, or cutting device, so that the latter may be moved around the interior of the barrel, a handle 26 is suitably mounted on the motor 8, and by means of this handle, and because of the toggle arm support for the motor, the motor and its cutter head may be moved around in a circle to cause the cutter head to operate in the desired manner upon the inside or inner surface of the barrel stave assembly shown in the drawings.

Preferably, as shown, the toggle arm support for the motor has a ball bearing support 27 for the arm 5, on the arm 4, as shown more clearly in Fig. 7 of the drawings, whereby the hinge connection between the arms 4 and 5 is freely operable, when the handle 26 is being used to move the motor and its cutter around the rim of the barrel.

It will be understood that after one end of the barrel is trimmed and cut in the desired manner, the other end can then be turned uppermost to receive the same treatment. Temporary hoops or bands 28 may be employed to retain the barrel assembly in barrel form, during the barrel crozing operation. During this operation, the brackets or positioning devices 29, or any other suitable means, can be employed for holding the barrel assembly in stationary position. If the machine is also a barrel stave setting up machine, in combination with the barrel crozing instrumentalities, the machine will have any suitable means for drawing the staves together at their upper ends, such as the means indicated generally by the dotted lines shown at 30 in Fig. 1 of the drawings. Thus, it will be seen that the invention comprising the barrel crozing instrumentalities is of such character as to permit convenient use thereof, either separately or on a barrel stave setting up machine. While the barrel stave assembly is being formed, or while it is being placed in position, the arms 4 and 5 permit the motor and its cutter head to be swung out of the way. When the barrel staves are ready for crozing, the handle 26 can be grasped to pull the motor and its cutter head into position above the barrel stave assembly, and the handles 13 and 16 can then be employed to lower the cutter head within the barrel, and the motor and its cutter head can then be locked at the desired height, thereby to insure the proper cutting and trimming of the end portions of the barrel staves.

It will be understood, of course, that the electric current for the motor 8 can be controlled by any suitable known or approved means, so that the rotation of the cutter head may be started and stopped at will.

From the foregoing, it will be seen that the rotary tool operates in a single horizontal plane, whereby all of the necessary cutting is done in one level of the rotary tool, so that it is not necessary to move the tool up and down to perform the different portions of the cutting operation. In other words, while the tool is operating in a fixed level, it trims the upper edge of the barrel, bevels the upper edge at the inner side thereof, and cuts a groove below the bevel. In addition, the rotary tool itself, through the medium of the gauge or stop disk 25, automatically controls the horizontal displacement or movement of the motor and the rotary tool, and thereby insures accurate control of the tool by the hand-grip 26, which latter is rigid with the front side of the motor. Inasmuch as the motor and the rotary tool are free to move in any direction, horizontally, it would be practically impossible for the attendant or user of the machine to trim and cut the edge portions of the barrel in the required manner, merely by using the eye to gauge the operation, for under such circumstances the cutter would be certain to cut too deep or too shallow, and would not perform the uniform operation on the barrel clear around the circumference thereof. However, with the provision of the said disk at the bottom of the rotary tool, the attendant or user of the machine is relieved of the necessity of using the eye to gauge the cutting operation, as all that is necessary is to move the tool around the edge of the barrel, with the bottom disk thereof bearing hard against the inner surface of the barrel, and this will automatically insure the desired uniform cutting action throughout the circumference of the barrel. At the same time, of course, and without removing the left hand from the grip 26, the operator or user of the machine may operate the hand-lever 13 and the small lever 16 to raise or lower the motor and the rotary tool, and to lock the motor at the desired height, whereby the rotary tool is always under full control and may be moved in any direction horizontally, at will, and may be conveniently placed in position wherever wanted, at any moment, by the operator or user of the machine.

What I claim as my invention is:

1. A barrel crozing machine for supporting the barrel in stationary position with its axis extending vertically during the operation of the machine, comprising means to support the barrel against rotation, a fixed vertical machine axis means at one side of the barrel, a support mounted to swing horizontally about said fixed axis, over the barrel, said support having a toggle-like joint therein, providing a shifting vertical axis of articulation therein, a head on the end of said support, an electric motor, a rack and pinion to support said motor for up and down adjustment on said head, a hand lever movable up and down to operate said rack and pinion, a locking device on said lever to lock the motor in the vertically adjusted position thereof, a rotary barrel crozing tool on the lower end of said motor, and a hand grip rigid with said motor, for moving said tool freely around the edge of the barrel, about said barrel axis, with means to engage the interior of the barrel and thereby insure accurate control of said tool by said hand grip, without which engaging means said tool would be free to cut off the entire upper edge of the barrel, said toggle-joint permitting movement of the motor toward and away from said fixed axis, in either the up or down position of said rack.

2. A crozing machine structure as specified in claim 1, said head having a flat outer face provided with a vertical guide for said motor.

3. A crozing machine structure as specified in claim 1, said hand lever being pivoted on one side of said head to swing up and down at one side of said hand grip, so that before the motor is moved horizontally by one hand it can be moved up or down by the other hand.

4. A crozing machine structure as specified in claim 1, said hand lever being supported on one end of the horizontal axis of said pinion, which pinion axis is in a horizontal plane intersecting the said other axes.

WALTER F. NEWHOUSE.